United States Patent
Le Devehat et al.

(10) Patent No.: US 9,661,269 B2
(45) Date of Patent: May 23, 2017

(54) SYSTEM FOR ENABLING COMMUNICATIONS AND CONFERENCING BETWEEN DISSIMILAR COMPUTING DEVICES INCLUDING MOBILE COMPUTING DEVICES

(71) Applicant: Polycom, Inc., San Jose, CA (US)

(72) Inventors: Arnaud Le Devehat, Cupertino, CA (US); Puneet Singh, San Jose, CA (US); Vaibhav Pande, Hyderabad (IN)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/506,234

(22) Filed: Oct. 3, 2014

(65) Prior Publication Data

US 2015/0097922 A1  Apr. 9, 2015

Related U.S. Application Data (60) Provisional application No. 61/886,541, filed on Oct. 3, 2013.

(51) Int. Cl.
*H04N 7/15* (2006.01)
*H04L 29/06* (2006.01)
*H04M 3/56* (2006.01)

(52) U.S. Cl.
CPC ........... *H04N 7/15* (2013.01); *H04L 65/1069* (2013.01); *H04L 65/403* (2013.01); *H04M 3/567* (2013.01); *H04M 2201/42* (2013.01); *H04M 2203/6009* (2013.01)

(58) Field of Classification Search
CPC ... H04L 65/403; H04L 65/1069; H04M 3/567
USPC ...................................................... 348/14.04
See application file for complete search history.

(56) References Cited

U.S. PATENT DOCUMENTS

| | | | | |
|---|---|---|---|---|
| 6,760,749 B1 * | 7/2004 | Dunlap | ................... | H04N 7/147 348/14.08 |
| 2005/0288961 A1 * | 12/2005 | Tabrizi | ................... | G06Q 10/00 717/126 |
| 2006/0195519 A1 * | 8/2006 | Slater | ................... | H04L 12/1822 709/204 |
| 2008/0104171 A1 * | 5/2008 | Berberian | ......... | H04M 3/42221 709/204 |
| 2008/0226049 A1 * | 9/2008 | Kumar | .............. | H04M 3/42187 379/202.01 |
| 2009/0110169 A1 * | 4/2009 | Whitsell | ............. | H04L 12/1818 379/205.01 |
| 2009/0271469 A1 * | 10/2009 | Benco | ................ | H04N 21/8146 709/201 |
| 2011/0187814 A1 * | 8/2011 | Nimri | ..................... | G10L 21/00 348/14.09 |
| 2012/0064976 A1 * | 3/2012 | Gault | .................... | H04N 21/241 463/42 |
| 2012/0159308 A1 * | 6/2012 | Tseng | .................... | G06F 9/4443 715/234 |
| 2012/0185604 A1 * | 7/2012 | Shatsky | ................ | H04L 67/306 709/228 |

(Continued)

*Primary Examiner* — Creighton Smith
(74) *Attorney, Agent, or Firm* — Blank Rome, LLP (57) ABSTRACT

In one general embodiment, a system for enabling communications and conferencing between dissimilar computing devices including mobile computing devices. In another embodiment a method for enabling communications and conferencing between dissimilar computing devices including mobile computing devices. In a further embodiment, a non-transitory computer-readable medium comprising instructions to cause one or more processors to enable communications and conferencing between dissimilar computing devices including mobile computing devices.

21 Claims, 10 Drawing Sheets

(56) References Cited

U.S. PATENT DOCUMENTS

| | | | |
|---|---|---|---|
| 2013/0109365 A1* | 5/2013 | Buzdugan | H04W 76/002 455/416 |
| 2013/0263020 A1* | 10/2013 | Heiferman | H04L 51/32 715/753 |
| 2013/0336170 A1* | 12/2013 | Broadworth | H04L 65/403 370/260 |
| 2014/0033067 A1* | 1/2014 | Pittenger | G06F 21/606 715/751 |
| 2014/0068007 A1* | 3/2014 | O'Gorman | H04N 7/147 709/219 |
| 2014/0074537 A1* | 3/2014 | Bargetzi | G08C 17/02 705/7.19 |
| 2014/0208213 A1* | 7/2014 | DeLuca | G06F 3/0481 715/730 |
| 2015/0046597 A1* | 2/2015 | Dolph | H04L 65/1069 709/227 |
| 2015/0056970 A1* | 2/2015 | Barrett | H04M 3/56 455/416 |
| 2015/0067044 A1* | 3/2015 | Bakaev | H04L 65/403 709/204 |
| 2015/0078209 A1* | 3/2015 | Arora | H04L 12/1818 370/261 |
| 2015/0081806 A1* | 3/2015 | Kanuturi | G06Q 10/1095 709/206 |
| 2015/0095329 A1* | 4/2015 | Sanio | G06F 17/3053 707/732 |
| 2015/0237214 A1* | 8/2015 | Blewett | H04M 3/563 379/202.01 |
| 2015/0381936 A1* | 12/2015 | Goyal | H04N 7/15 348/14.06 |
| 2016/0156680 A1* | 6/2016 | Pinter | H04N 7/15 348/14.13 |

\* cited by examiner

Contacts

Names

| Name | | |
|---|---|---|
| Name 1 | Audio | Video |
| Name 2 | Audio | Video |
| Name 3 | Audio | Video |
| Name 4 | Audio | Video |
| Name 5 | Audio | Video |
| Name 6 | Audio | Video |
| Name 7 | Audio | Video |
| Name 8 | Audio | Video |
| Name 9 | Audio | Video |

SYSTEM FOR ENABLING COMMUNICATIONS AND CONFERENCING BETWEEN DISSIMILAR COMPUTING DEVICES INCLUDING MOBILE COMPUTING DEVICES

CROSS-REFERENCE TO RELATED APPLICATIONS

This application claims the benefit of U.S. Provisional Application No. 61/886,541 filed Oct. 3, 2013 entitled "SYSTEM FOR ENABLING COMMUNICATIONS AND CONFERENCING BETWEEN DISSIMILAR COMPUTING DEVICES INCLUDING MOBILE COMPUTING DEVICES," and also claims benefit of Indian Provisional Application No. 1173/KOL/2013 filed Oct. 10, 2013 entitled "CONTEXT SENSITIVE FRAMEWORK FOR VOICE OVER INTERNET PROTOCOL MEDIA SESSIONS," both of which are expressly incorporated herein in their entirety by reference.

BACKGROUND

The present disclosure relates generally to videoconferencing systems, and more particularly, to a system for enabling communication between dissimilar communications devices.

There are numerous different and dissimilar devices used for communication between two or more parties today. For example, one party, or user, may be using a mobile computing device, such as a tablet computer or smartphone, to communicate while the other party is using a stationary computing device, such as a desktop computer, to communicate. As can be appreciated, it may be substantially complex to facilitate optimal communication between such dissimilar computing devices and to optimize communications therebetween.

In such potential communications, there are typically several parameters that need to be considered in order to determine an optimal means of communications between the two devices. For example, in videoconferences, a negotiation protocol is often required to prepare for the videoconference, as well as and who will initiate, or host, and who'll participate in the videoconference.

Set up for such a conference can also be substantially complex, due to numerous factors. For example, if the conference is going to include both videoconferencing participants and audio only participants, set up for the conference becomes complex. Connecting participants located externally to an entity hosting the conference is different than connecting participants located internal to the entity. Further, if the host or participants in the conference are located within an office, the set up for the conference may be different if they are located remotely, such is in the home. As can be appreciated, the more considerations and factors involved with setting up a conference and the devices used therein, the risk of errors in properly setting up the conference is increased. Thus, it can be difficult to locate participants, determine optimal means of connecting participants based on their communications devices, and effectuate conferences and calls that provide an optimal experience for the participants.

As the computing power and features found on portable computing devices, such as smartphones and tablet computers, continues to advance their use is becoming more commonplace. Thus, smartphone and tablet computer users often desire to participate in conference via their portable computing device. However, a disadvantage of communicating via portable computing devices is that the experience for participants may be less than optimal.

To provide an optimal experience for participants, often there is a substantial amount of communication between the host and participants to set up the conference, prior to the actual conference. This set up communication can include determining where the host and participants are located, who will commence the conference, and so forth. The time spent to set up the conference may be substantial. Thus it would be desirable to find ways to minimize the effort and time required on the part of the conference participants to set up the conference, while still facilitating optimal conferencing experiences and device usage.

A related problem arises for a user in even determining which conferences or media sessions to participate in. Context-aware services can be used to assist the user in this regard. In general terms, context can refer to any aspect of a situation where an entity (person, place, or device) may invoke computational functions. Any given context may include information about the physical world and/or about the logical world surrounding the user and/or device. Information about the physical world may include location, movement, temperature, device characteristics, and other information. The logical world may consist of information about identity, privileges, preferences, and relationships in different domains, such as home, work, family, legal, and others. Historical information about any of these aspects might also be included.

Recent trends in computing are extending the concept of context to include many facets of the user's physical environment. Computing device characteristics such as screen size, communications capabilities, keyboard configuration, accelerometers, GPS sensors, network identity, and other characteristics and information are being added to accurately characterize the physical context within which applications are being used.

SUMMARY

In one aspect, a system for enabling communications and conferencing between dissimilar computing devices including mobile computing devices is disclosed. A web portal may be presented to users in the form of a graphical user interface to allow users to configure their information and interaction preferences with the system. The personal profile graphical user interface may include video options, audio options, call options, and personal information. The personal profile graphical user interface allows users enable or disable each personal video, or audio only, endpoint that they may operate. Endpoints that provide both audio and video data streams, may be ranked higher than endpoints that provide audio data streams only. Geo-location information may be automatically collected from endpoints by the system. The personal profile interface may include a directory feature. The directory may comprise a listing of users with which a user communicates and may include one or more endpoints associated with each user in the directory.

A user may desire to contact one or more other participants. The user may select one or more participants from the directory. The system may then determine an optimal endpoint, for example an endpoint capable of providing either audio or video data streams, or both, operated by each selected participant and by the user. The system then contacts the determined endpoint for each selected participant and user, and generates a conferencing connection. Selected participants with endpoints capable sending and receiving both video and audio data streams may be connected to the host via videoconferencing, while participants with endpoints that are not capable of sending or receiving video data streams may be connected to the host via an audio connection only. The system may use geo-location information for determining the location of endpoints operated by users. If an endpoint is located at a determined location and at a determined time, such as when a conference is scheduled to occur, the system may contact the determined location and commence a conference.

In another aspect, a system for a context sensitive framework for conferencing sessions can gather context specific information including "time," "position," "participants," "topic" and/or "category" of the media session. Once the context specific information is gathered, the system makes context information available. Upcoming media sessions may be listed on a website and be searchable by their context information including time, position (location), participants, topic and/or category of the media session. A user may access the website and search the context information for one or more desired media sessions. The user may receive notifications from the system of potentially desired media sessions, such as topics and/or categories of media sessions which may be of interest to the user. The user may access the website and search desired media session. Results returned to the user may depend on time and location of the user. Any media session results are displayed to the user on an endpoint they operate. The user may then select a media session in which to participate from any media sessions returned in their search. Optionally, the user may search the discovered media sessions for additional context information, such as a particular topic or category of subject matter to be presented during the media session. The user may also search for participants in the media session. As an alternative, the user may first search the context information for a desired topic or category that may be of particular interest to the user. Then, the user searches any discovered media sessions for a suitable location and time.

DETAILED DESCRIPTION

The following description is made for the purpose of general illustration and is not meant to limit the inventive concepts claimed herein. Further, particular features described herein can be used in combination with other described features in each of the various possible combinations and permutations.

Figure 1:
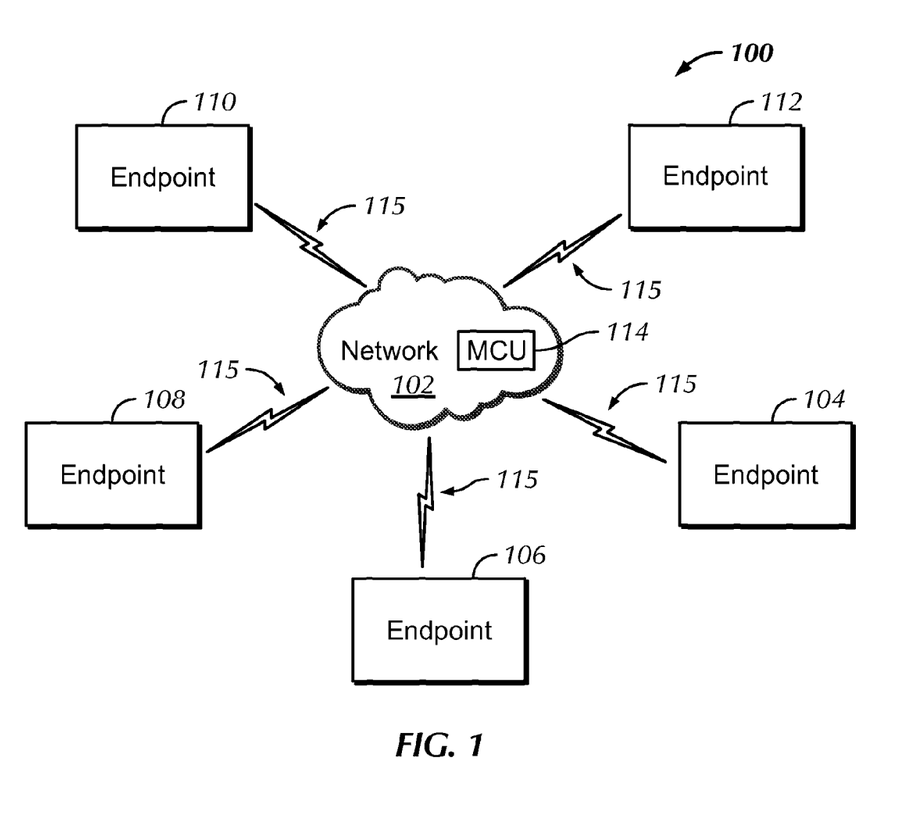
FIG. 1 illustrates a schematic diagram of an embodiment of a system for enabling communications and conferencing between dissimilar computing devices including mobile computing devices.
Figure 2:
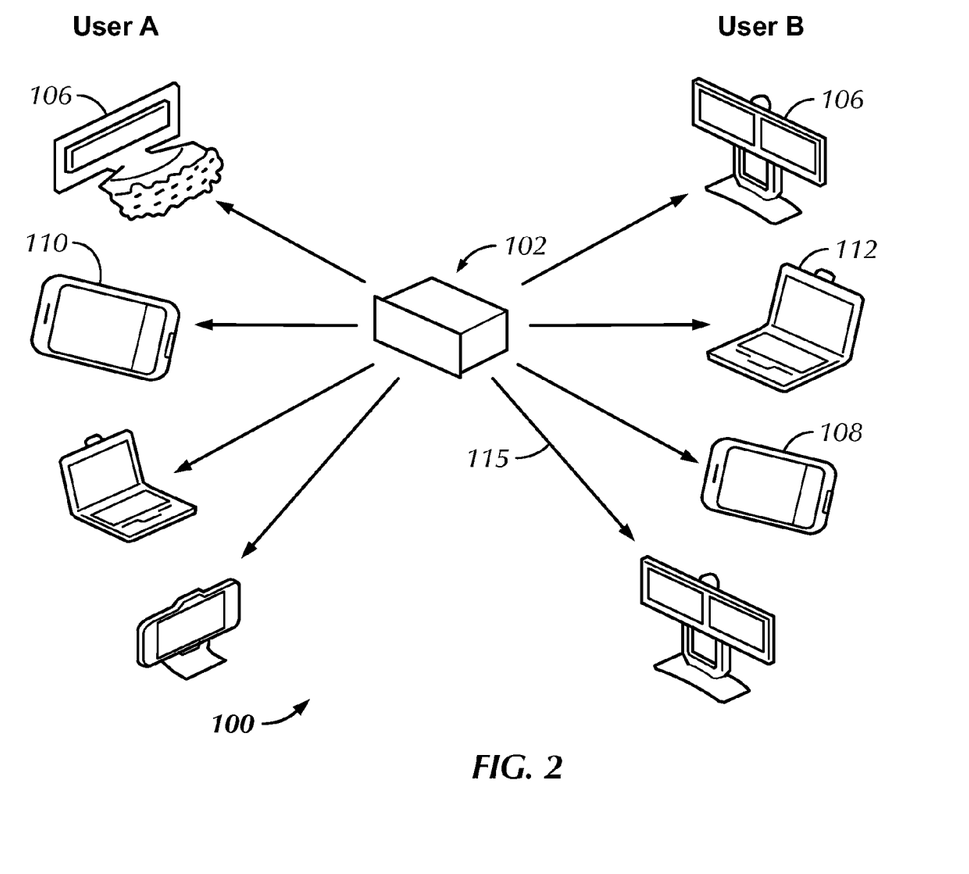
FIG. 2 and FIG. 3 illustrate simplified diagrams of embodiments of a system for enabling communications and conferencing between dissimilar computing devices including mobile computing devices showing different computing devices including mobile computing devices used with the system.
Figure 3:
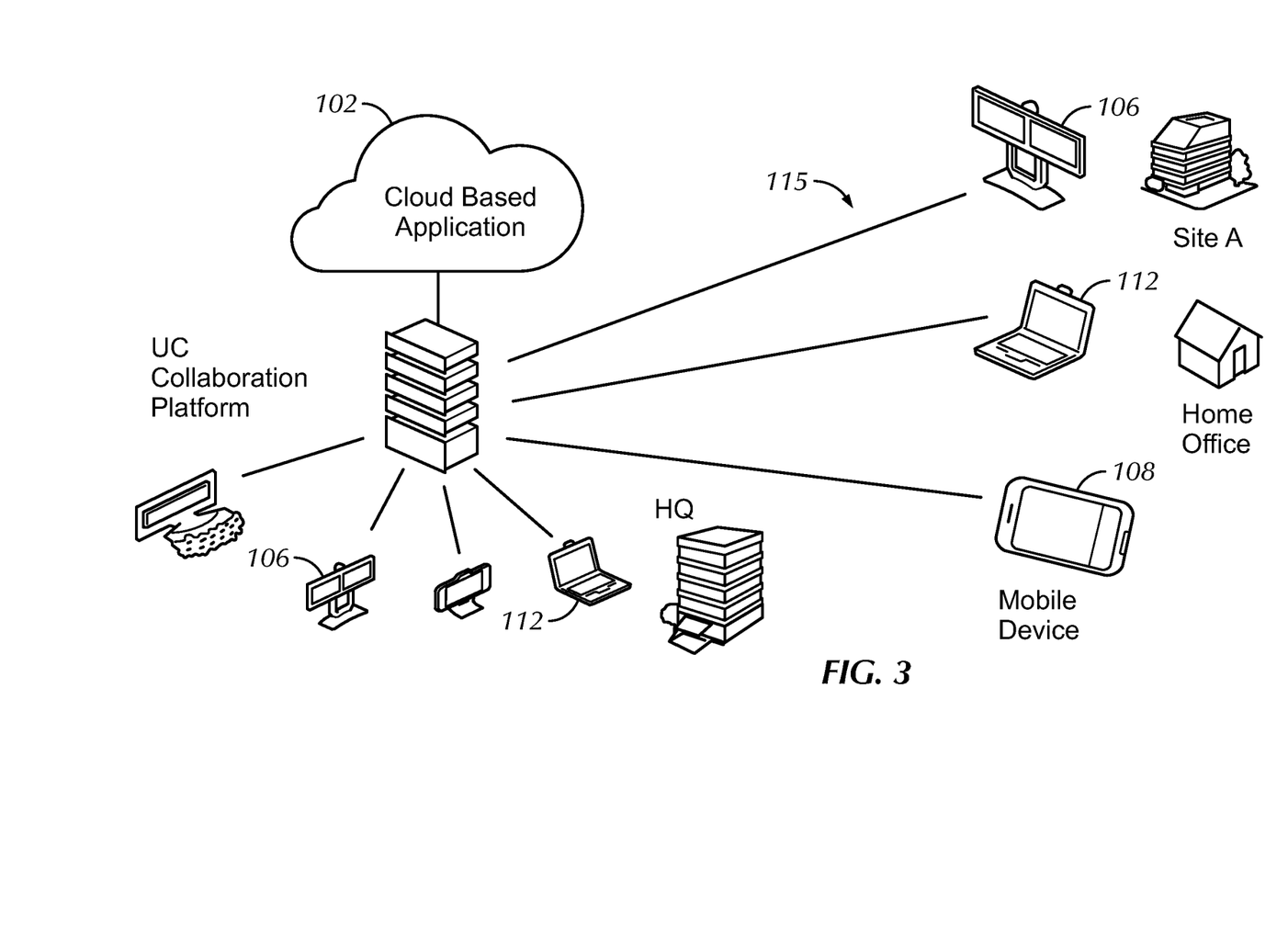

As illustrated in FIG. 1, FIG. 2, and FIG. 3, there is shown generally at 100, an embodiment of a system for enabling communications and conferencing between dissimilar computing devices including mobile computing devices. In a general embodiment, the system 100 may include an application residing on a network 102 which facilitates optimal communication between dissimilar communications devices 104-112. The system 100 receives instructions, such as commands or requests, from communications device 104-112 operated by users, and processes the instructions to provide optimal communication between users, regardless of a communications device 104-112 they may be operating.

In the system 100, communications devices 104-112 may communicate over one or more networks 102 (only one is shown for ease of discussion only). The network 102 may take any form including, but not limited to, a local area network (LAN), a wireless network, or a wide area network (WAN) such as the Internet, peer-to-peer network, etc. In the embodiments, the network 102 includes protocols to provide audio and/or visual communication sessions on the network 102. In some embodiments, the network 102 may use an H.323 standard to address call signaling and control, multimedia transport and control, and bandwidth control for point-to-point and multi-point communication. Optionally or additionally, the network 102 may use Session Initiation Protocol (SIP) for controlling multimedia communication sessions such as voice and video calls over the network 102.

At least one multipoint control unit (MCU) 114 that controls communications between communication devices 104-112 is included in the system 100. The MCU 114 may be located at any suitable location within the system 100.

Hereinafter "endpoint" and "communications device" may be used interchangeably. An exemplary endpoint 104-112 of the system 100 is shown at 104 in FIG. 4. It is to be understood that the exemplary endpoint 104 may comprise any endpoint 104-112 within the system 100. An endpoint 104-112 may comprise any suitable device capable of one or more of audio communication and visual communication via the network 102. In some embodiments, one or more endpoints 104-112 may be capable of both audio and visual communications, such as sending and receiving audio data and video data streams, via the network 102. Exemplary endpoints 104-112 may include, but are not limited to, videoconferencing systems 106, desktop computers configured with one or more peripherals allowing conference communication, for example, cameras, microphones, speakers, etc. Portable computing devices may include smartphones 108, tablet computers 110, laptop computers 112, and other portable computing devices; which are at least capable of communicating with the network 102 via known IP protocols such as H.323 and SIP. In the embodiments, endpoints comprising portable computing devices 108-112 are typically connected wirelessly 115 to the network 102.

Figure 4:
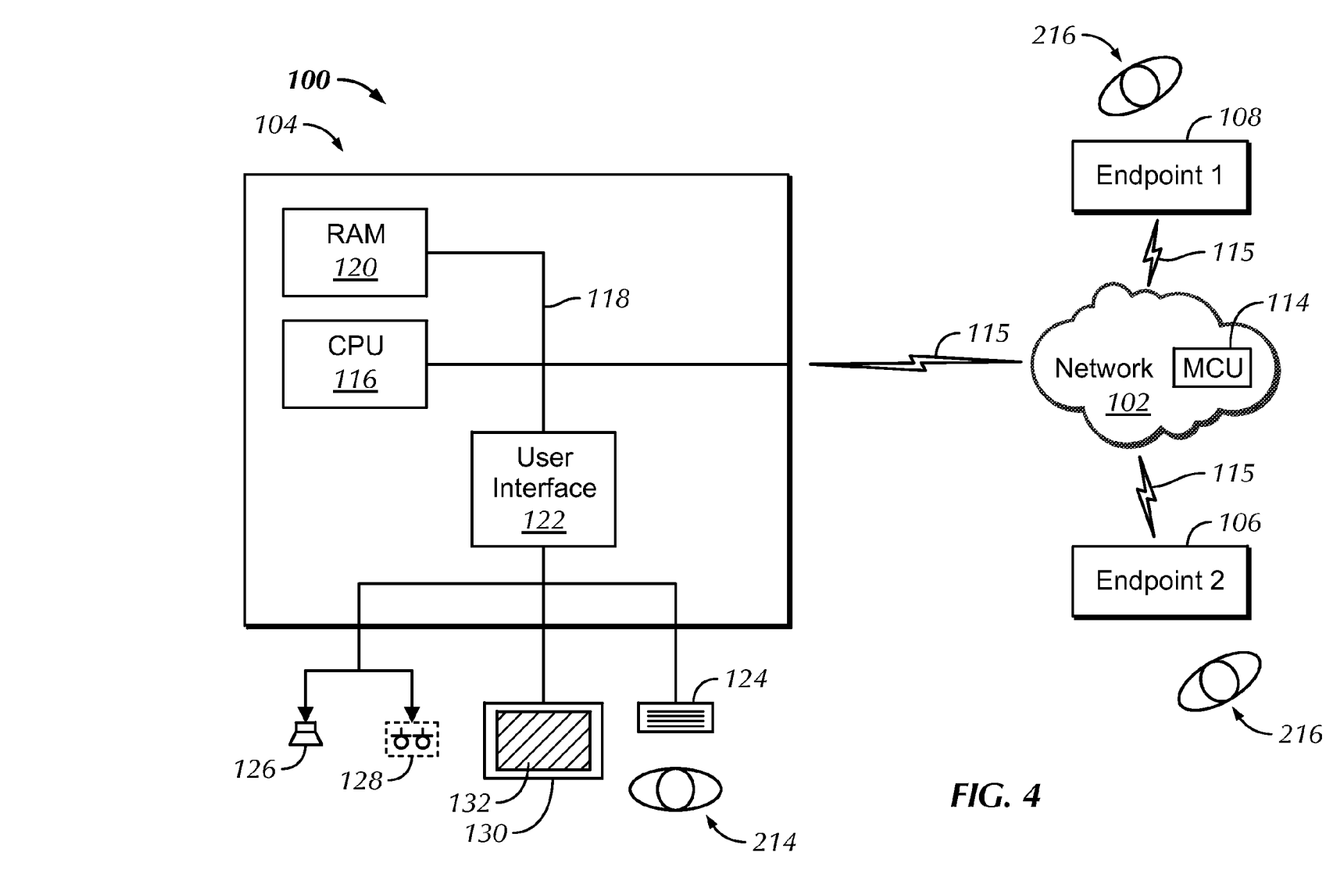
FIG. 4 illustrates a schematic diagram of an embodiment of a system for enabling communications and conferencing between dissimilar computing devices including mobile computing devices showing an exemplary computing device.

In the embodiments, the exemplary endpoint 104 may include a processor 116, and other components interconnected via a system bus 118. Exemplary components may include a Memory (RAM) 120 and a user interface adapter 122. The user interface adapter 122 may be provided for connecting user interface devices such as a keypad 124, speaker 126, and microphone 128 to the bus 122. The endpoint 104 may also include a display 130 coupled to the bus 122. In some embodiments, a screen 132 of the display 130 may comprise a touchscreen to allow a user 134 to manipulate data via the screen 132 as well as the keypad 124.

Figure 5:
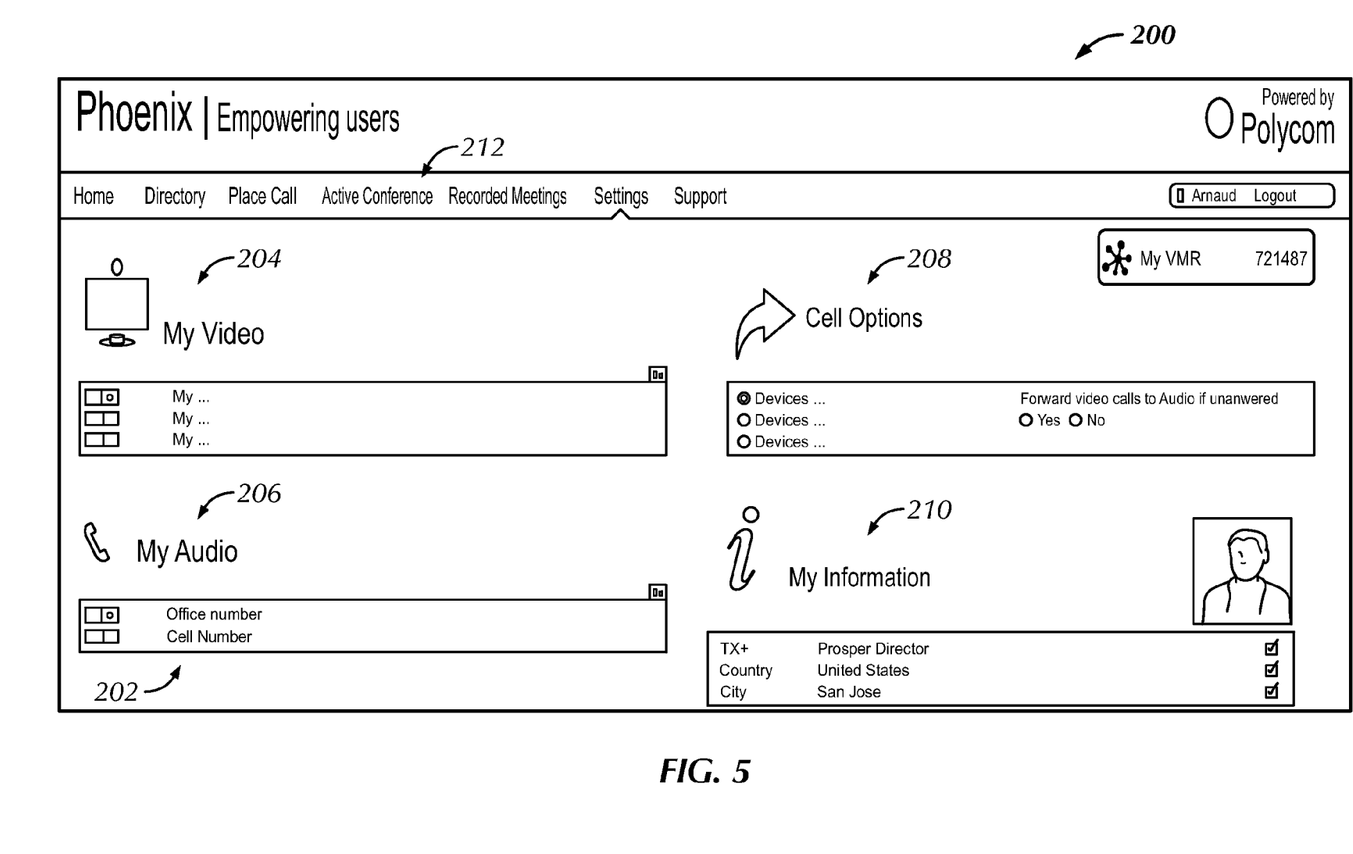
FIG. 5 illustrates a screenshot of an embodiment of a web portal of a system for enabling communications and conferencing between dissimilar computing devices including mobile computing devices.

Referring to the Figures and particularly FIG. 5, users may communicate with the system 100 via a web portal. The web portal may be presented to a user in the form of a graphical user interface, shown generally at 200. In optional embodiments, where the user communicates with the system 100 using a portable computing device such as a smartphone 108 or tablet computer 110, the web portal 200 may comprise all or a portion of a mobile application. The mobile application, commonly referred to as "mobile app," can designed to run on smartphones 108, tablet computers 110 and other mobile devices and may or may not, have the entirety of the functionality of the graphical user interface 200 discussed hereinafter.

One exemplary graphical user interface may comprise a personal profile graphical user interface 202 provided to allow a user to configure their information and interaction preferences with the system 100. The personal profile graphical user interface 202 may include video options 204, audio options 206, call options 208, and personal information 210. The personal profile graphical user interface 202 allows users enable or disable each personal video endpoint 104-112 that they may operate, under video options 204, and endpoints that provide only audio, using audio options 206. The personal profile interface 202 also allows users to sort their endpoints 104-112, as well as selectively activate or deactivate one or more of their endpoints 104-112. For example, a user that desires video communication, if available, may prioritize endpoints that provide both audio and video data streams higher than endpoints that provide audio data streams only. Alternatively, a user that desires audio communication only may prioritize endpoints differently. Other prioritization schemes are also possible based on whatever characteristics of the device that a user prefers or deems important. In optional embodiments, geo-location information may be automatically collected from endpoints 104-112 by the system 100, obviating the need for users to input this information. This geolocation information can also be used to select an endpoint at which a user is reached. For example, if geo-location information indicates that a user's mobile device is colocated with an office conferencing system, then a call to that user can be automatically routed to such a system. Similarly, if a user's mobile device indicates is determined to be colocated with a commonly used common-area conferencing system, such as that in a conference room, a call may be routed to that lcoation. If a user's mobile device indicates that it is not colocated with any other devices associated with that user, the conferencing session may be routed to that mobile device, either as a video conference, or as audio only, depending on the pre-selected preferences specified by the user.

Users may choose how they are going to be contacted by the system 100 using call options 208. For example, the user may choose to have their highest ranked endpoint 104-112 contacted by the system 100 first, or have their endpoints 104-112 contacted in succession, or they may choose to have multiple endpoints 104-112 they operate contacted simultaneously. Optionally, if the user is unable to answer any communication requests, they may choose to forward video calls to audio devices if unanswered. The personal profile interface 202 may additionally include a directory feature 212. The directory 212 may comprise a listing of users with which the user communicates. Optionally, the directory 212 may include one or more endpoints 104-112 associated with each user in the directory 212, as shown in FIG. 6.

Figure 6:
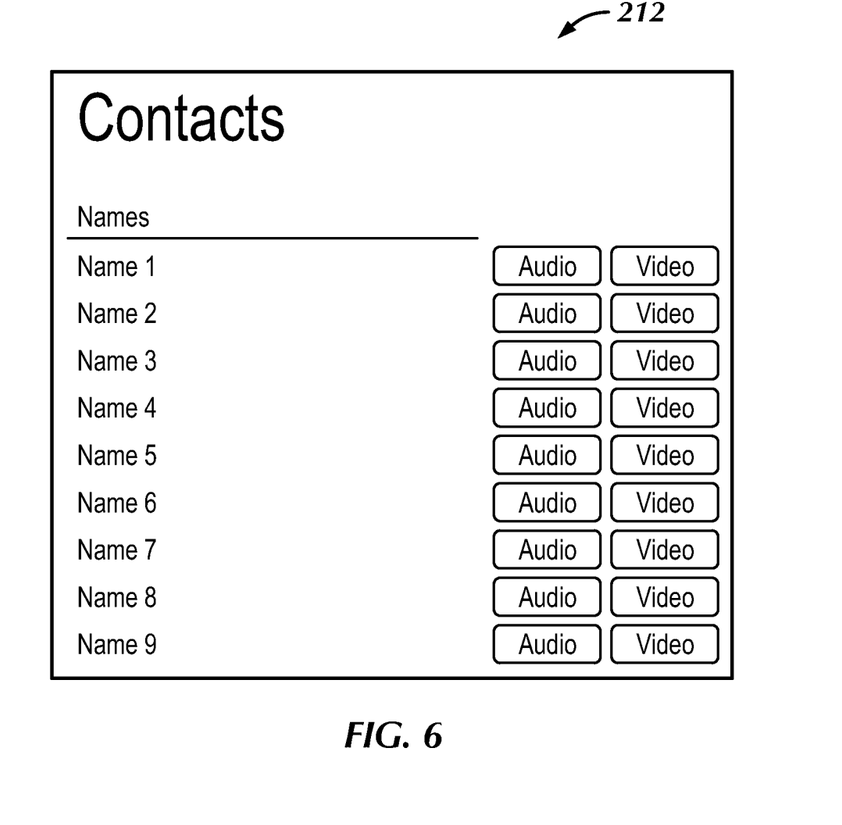
FIG. 6 illustrates an embodiment of an exemplary user directory of the web portal of FIG. 5.

As illustrated in FIG. 4, FIG. 5, and FIG. 6, upon the user configuring their personal profile, the user will be referred to hereinafter as host 214, may desire to contact one or more other users, referred to hereinafter as participants 216 for ease of discussion only, via the system 100. Using the directory 212, the host 214 selects one or more participants 216 from the directory 212. The system 100, through API calls for example, determines an optimal endpoint 104-112 operated by each selected participant 216 and by the host 214. The system 100 then contacts each selected participant 216 and by the host 214, per the configuration of their personal profile and/or additional information, such as geo-location information. If the system 100 is provided with multiple endpoint 104-112 options for one or more selected participants 216 and host 214, system 100 may contact the selected participants 216 and host 214, system via their highest ranked endpoint 104-112, via a series of endpoints called sequentially, or via multiple endpoints simultaneously until the participant is reached. The system 100 then contacts the determined endpoint 104-112 for each selected participant 216 and by the host 214.

Upon determining an optimal endpoint 104-112, for example an endpoint capable of providing both audio and video data streams, for the host 214 and selected participants 216, the system 100 contacts the host 214 and participants 216 and generates a videoconference connection. If one or more selected participants 216 are not capable of sending or receiving video data streams, either due to the capabilities of their endpoint 104-112 or the current location of the endpoint, the system 100 may contact those participants 216 via an audio connection only. The system 100 may contact audio only participants 216 on a most suitable audio only an endpoint 104-112 that they operate. In some cases, a user may have available a plurality of endpoints providing different characteristics. For example, a user may simultaneously have a mobile device, such as a phone, which is suitable for audio communication and possibly interpersonal video communication, but which may not be preferable for display of meeting content such as shared documents, presentation slides, and the like. However, such a user may have available a tablet device or laptop computer that is well suited to the display of such content. In such a situation, the system 100 could establish multiple connections with the user, with the connection to each device being used for a desired use as specified by the user. For example, a user could specify in his profile that if he is out of his office, audio should be routed to his mobile telephone, while video and presentation information should be routed to his laptop computer or tablet device.

Any variety of other such permutations could also be selected by a user depending on the devices available to him and his own personal preferences. For example, a user could specify that he is only available for certain conference types and/or to use conference devices at certain times. For example, a user could configure his mobile device to not accept calls during evening hours to avoid disruptions to personal time or to configure a desktop conferencing system to not accept connections in the early morning hours to allow for enhanced productivity.

As an option the host 214 may contact selected participants 216 via an audio only connection, if for example, either the host 214 or participants 216 have audio only capable endpoints 104-112 or for logistical reasons. In this embodiment, the system 100 contacts the host 214 and participants 216 on a most suitable audio only an endpoint 104-112 that they operate. Thus, in the system 100, the host 214 needs only to select desired participants 216 with which to hold a videoconference or audio conference. The system 100 then determines an optimal endpoint 104-112 operated by the host 214 and each selected participant 216 to provide an optimal experience between the host 214 and participants 216. Once the optimal endpoint 104-112 operated by the host 214 and each participant 216 is determined, the system 100 establishes a connection between the host 214 and participants 216 and either a videoconference, video and audio conference, or audio only conference commences.

Figure 7:
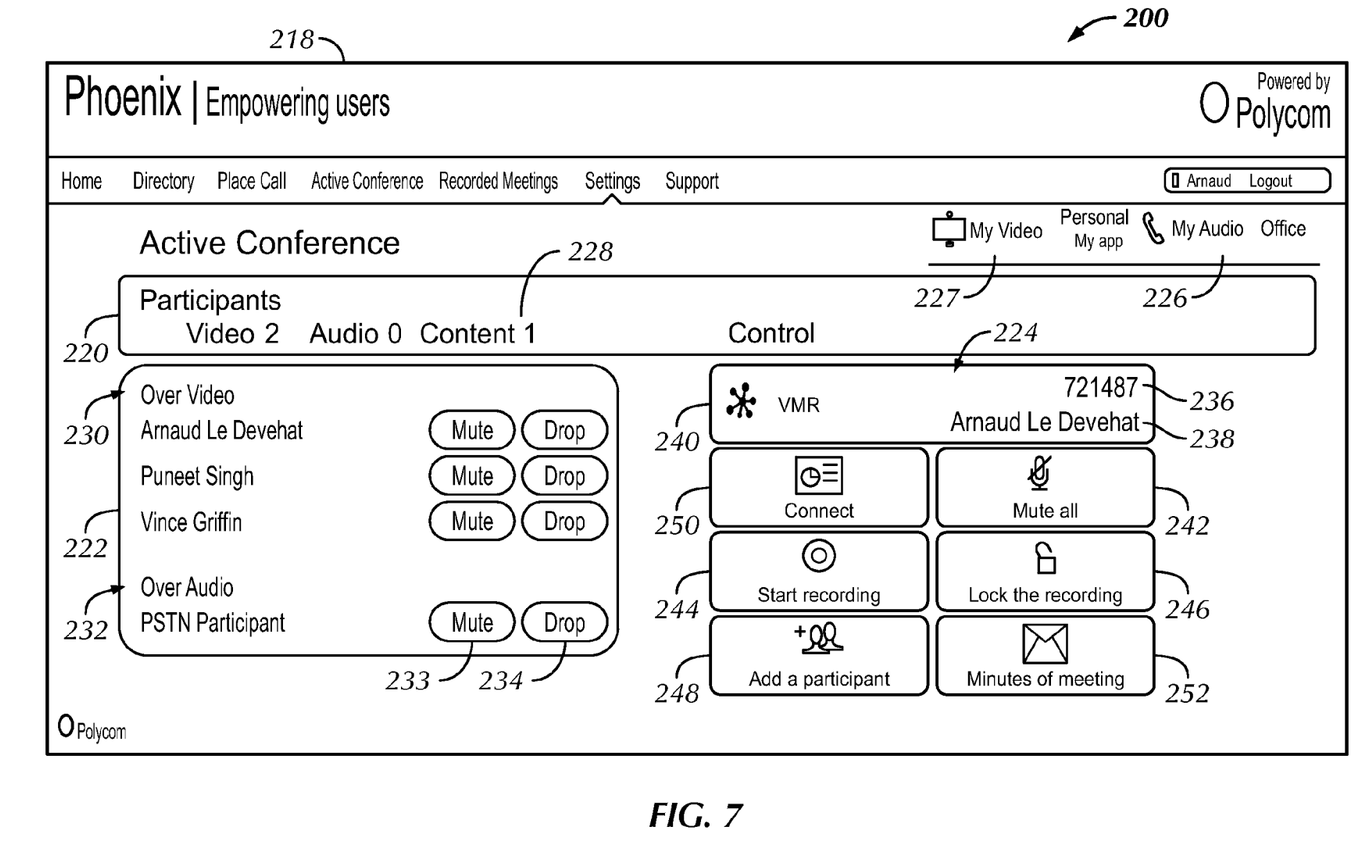
FIG. 7 illustrates an embodiment of an active conference window of the web portal.

FIG. 7 illustrates an embodiment of the web portal 200 comprising an active conference window 218. Upon commencing videoconference or audio conference the active conference window 218 may be generated on an endpoint 104-112 operated by the host 214 and on one or more an endpoints 104-112 operated by participants 216 in an ongoing conference. In some embodiments the active conference window 218 may include a participants window 220, a connection type window 222, a control window 224, and personal windows 226, 227. The participants window 220 may show the number of participants 216 in the conference, their connection type to the conference, video (video and audio data streams) or audio (audio only data stream), and any purely data stream 228. The connection type window 222 may show each participant 216 in the conference and whether their connection is video 230 or audio only 232. The connection type window 222 may optionally include "mute" and "drop" buttons 233, 234. The mute button 233 may be provided to allow the host 214 to selectively mute the audio stream of certain participants 216, while the drop button 234 allows the host 214 to disconnect selected participants 216 from the conference. If desired, additional buttons could be provided to perform other desired conferencing functions, such as allowing the host 214 to drop video while retaining audio for certain participants or to designate a specific participant for the sharing of content, etc.

The control window 224 can provide various additional features for controlling the conference. For example, the control window 224 may include a virtual meeting panel 236 which indicates the conference host 238 and contact number 240 for the conference. Optionally, the control window 224 may include a "mute all" button 242, "start recording" button 244, "lock meeting" button 246, "add participant" button 248, "content" button 250, and "minutes" button 252. The mute all button 242 provides the functionality of simultaneously muting all participants 216 in the conference, while the content button 250 may be provided to include a data stream in the conference. The lock meeting button 246 may be provided to prevent additional or uninvited participants 216 from joining the meeting, in some embodiments. The start recording button 244 is provided to record the audio stream, and optionally video stream, of the conference, while the minutes button 252 enables the host 214 to message participants 216, save, or otherwise use the recorded conference. The add participant button 248 enables the host 214 to add participants 216 to an ongoing conference.

As discussed above, the system 100 can use location information for determining the location of endpoints 104-112 operated by users. In some embodiments, if an endpoint 104-112 is located at a determined location and at a determined time, such as when a conference is scheduled to occur, the system 100 may contact the determined location and commence a conference. For example, a user operating an endpoint 104-112 enters a determined location, such as a conference room in an office building, at a determined time, such as when a videoconference is scheduled to occur. Presence of a user can be determined in a variety of ways, including presence of a user's mobile device or other identifying device, tracking of security badges or other similar information, or by biometric identification of a user including such things as facial or voice recognition by a conferencing device. The system 100 associates the endpoint 104-112, location, and time, processes the information, and invokes the videoconference.

In another embodiment, the user operating an endpoint 104-112, enters a location, such as a conference room in an office building. The user actuates the endpoint 104-112 to contact the system 100. The endpoint 104-112 may contact the system 100 via a personal information manager (discussed hereinafter), mobile app, or other suitable method. Optionally, the endpoint 104-112 may contact the system 100 via the web portal 200, as discussed previously. The user invokes the personal information manager, web portal 200, mobile app, or other suitable means running on the endpoint 104-112. The personal information manager, web portal 200, or mobile app, may display a conference occurring at a determined time, and joining the conference via the system 100.

Figure 8:
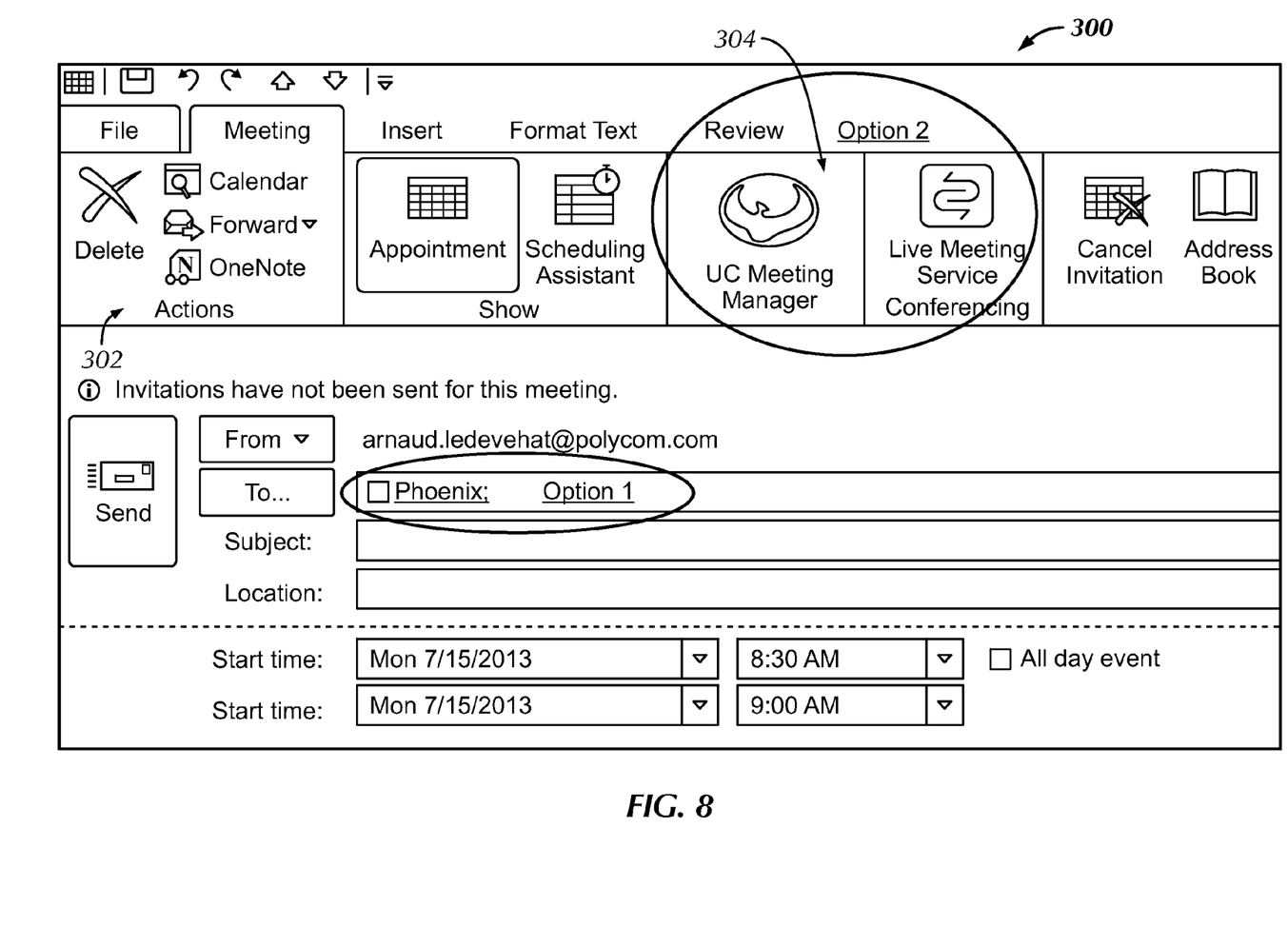
FIG. 8 illustrates an embodiment of a personal information manager of a system for enabling communications and conferencing between dissimilar computing devices including mobile computing devices.

FIG. 8 illustrates an embodiment where the system 100 further comprises a personal information manager, such as a meeting management interface 300. The meeting management interface 300 allows a user to create meeting invites, that may include date, time, and participant(s). The meeting management interface 300 may comprise a standalone software product, a mobile app, or may comprise an add-on to an existing personal information manager 302. One or more invitees may be invited with the interface 300 using the system 100. As described further below, the personal information manager/meeting management interface may also allow a user to identify one or more conference or other media sessions in which he wishes to participate and to join or schedule such conferences or sessions.

Figure 9:
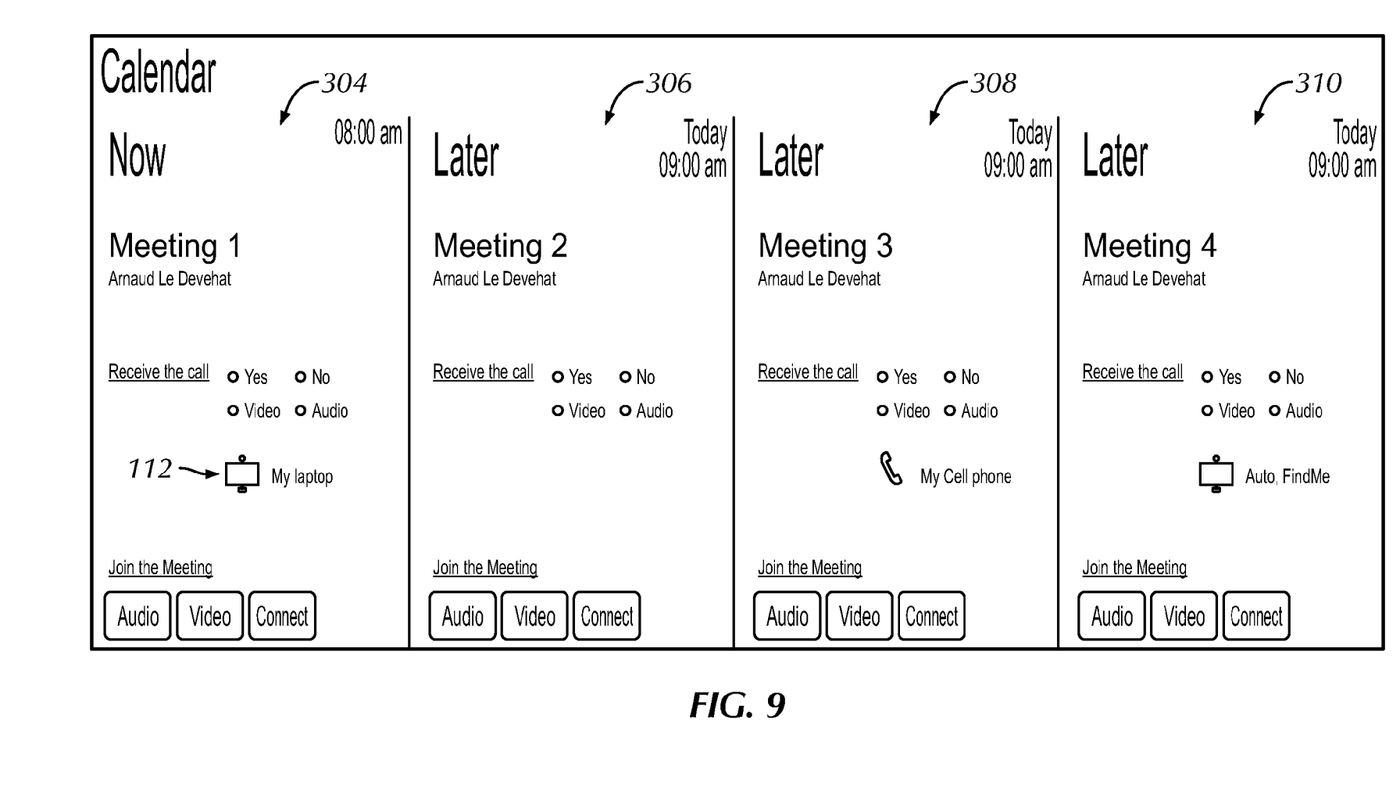
FIG. 9 illustrates an embodiment of a user interface of a system for enabling communications and conferencing between dissimilar computing devices including mobile computing devices.

As illustrated in FIG. 8 and FIG. 9, a user, such as a participant 216, may join a meeting or session using any of several different means. As illustrated at 304, the user receives a call on an endpoint, such as a laptop computer 112, via SIP or H.323 software. The system 100 then initiates a call as specified by the user. As an option, illustrated at 306, the user invokes a call, such as a video, via the interface 300. As an option, illustrated at 308, if the user is in transit and receives an audio meeting invite via a smartphone 108, or other portable computing device, they may be operating, the interface 300 and system initiates the call. The system 100 can invoke the call to obviate the need for the user to input a complex number or preform other complex functions with their smartphone 108, which may be difficult or dangerous while the user is in transit. As a further option, illustrated at 310, using the location information previously discussed, the system 100 operates the interface 300 and automatically locates the desired participants and/or users. Users are able to view their meeting invites, via meeting management interface 300, or via the mobile app, or via an add-on to an existing personal information manager 302.

Figure 10:
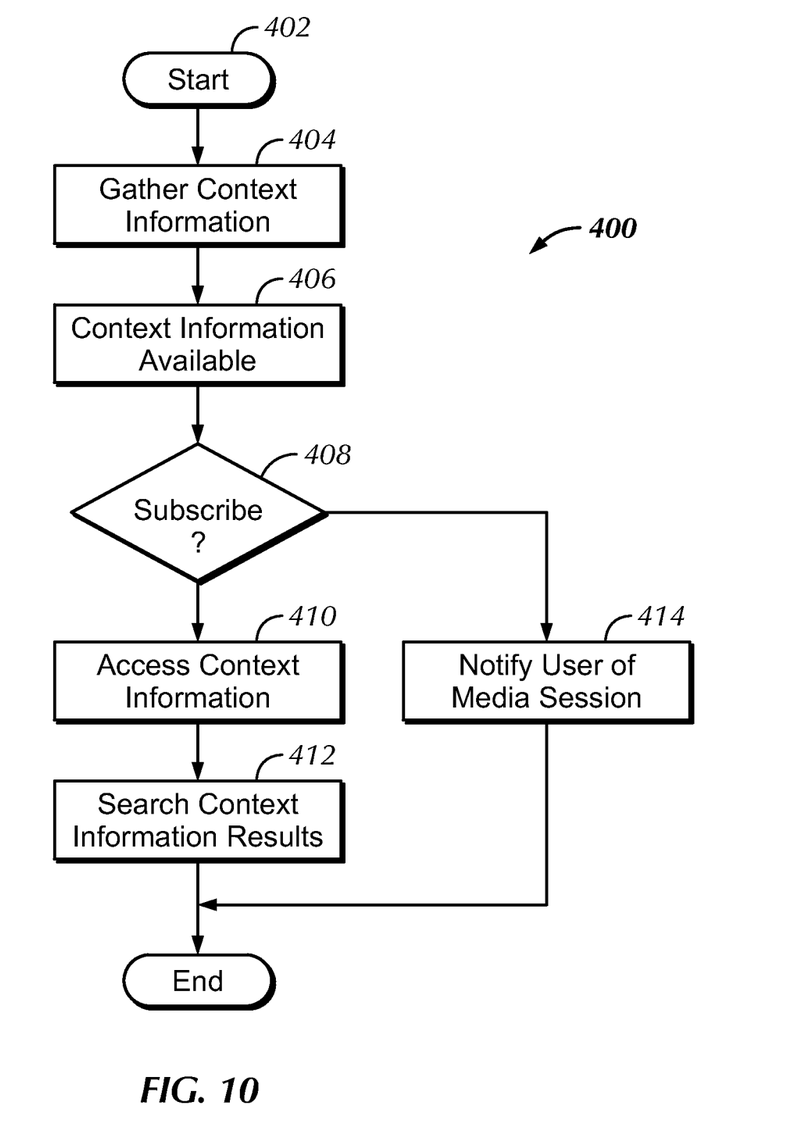
FIG. 10 illustrates an embodiment of a method for using context specific information to facilitate a user's interaction with various exemplary services during a VoIP media session.

Referring to FIG. 10, an embodiment of a method for using context specific information to facilitate a user's interaction with various exemplary services during a media session is shown at 400. The method 400 commences in start operation 402. In operation 404 context specific information for a media session is gathered. In the embodiments, the context specific information that is gathered may include, but is not limited to, "time," "position," "participants," "topic" and/or "category" of the media session. Time may relate to the time that the media session is to be held, including a start time and an end time. Position may relate to the location of a host, presenter, or similar entity that may be presenting the subject matter of the media session. Participants may comprise information relating to one or more endpoints 104-112, and thus the users thereof, participating in the media session. Topic or category may relate to the subject matter to be presented during the media session.

Once the context specific information is gathered, the system 100 makes context information available, in operation 406. In the embodiments, the context information may be made available via the network 114, such as via a service, website, or other similar means. For example, upcoming media sessions may be listed on a website and be searchable by their context information including time, position (location), participants, topic and/or category of the media session. A user may access the website and search the context information for one or more desired media sessions. Optionally, the user may subscribe to a website or service and search the context information for one or more desired media sessions.

In operation 408, it is determined if the user is subscribed to a website or service where the context information is made available. If the user is subscribed to the website or service, they may receive notifications therefrom of potentially desired media sessions, such as topics and/or categories of media sessions which may be of interest to the user. If the user is not subscribed to the website or service, the method 400 continues to operation 410.

In operation 410, a user accesses the website to search for a desired media session. For example, the user knows they are going to be in a particular location, San Jose, Calif. for example, at a particular point in time, Wednesday between 3 p.m. and 6 p.m. They then search the context information for media sessions, such as marketing related media sessions for example, occurring at the particular location and at the particular point in time. If any marketing related media sessions are occurring at the particular location (San Jose, Calif.) and at the particular point in time (Wednesday between 3 p.m. and 6 p.m.), they may be displayed, on the screen 132 of the endpoint 104-112 operated by the user. The user may then select a media session in which to participate from any media sessions returned in their search.

Optionally, in operation 410, the user may search the discovered media sessions for additional context information. The user may search the discovered media sessions for topic and/or category of the media session, if they are interested in a particular topic or category of subject matter to be presented during the media session. For example, if the user is interested in "online marketing," they may search the discovered marketing related media sessions, for a media session directed towards online marketing. Further, if they are interested in online marketing using social media, for example, they can search the discovered marketing online marketing media sessions for a media session that includes social media subject matter that will be presented during the media session. The user may also search for participants in the media session. As an alternative, in operation 410, the user may first search the context information for a desired topic or category that may be of particular interest to the user. Then, in operation 412, the user searches any discovered media sessions for a suitable location and time.

Returning to operation 408, if it is determined that the user is subscribed to the website or service, the method 400 continues to operation 414 where the website or service notifies the user that a media session which meets all or some of their desired context information is to occur. Further, if the user is in a particular location the website or service may notify the user of a media session which meets their desired context information, and may be relevant to the user's location. For example, the user may subscribe to the website or service and indicate desired context information, including topics and/or categories of interest. They may also indicate locations and times where they may be available for media sessions. The website or service may then notify the user when a media session which meets all or some of their desired context information is to occur. The website or service may notify the user of an upcoming media session due to context information such as one or more of topic, category, or participants that may be interest to the user based on their subscription to the website. In embodiments, where the endpoint 104-112 comprises a portable computing device, such as smartphone or tablet computer, the notification may be sent to the endpoint 104-112 and displayed the screen 132 of the device. Optionally, if the endpoint 102-110 comprises a stationary computing device, such as a desktop computer, the notification may be sent to a personal information manager, or similar program, running on the computer. The method 400 then continues to operation 416, where method 400 terminates.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A system for enabling communications between users, the system comprising a memory storing and a processor for executing instructions to cause the system to:
   present to a user a personal profile graphical user interface for controlling video, audio, and call options and permitting the user to configure their interaction preferences, including enabling or disabling one or more endpoints associated with the user and prioritizing the endpoints in order of desired contact; and
   collect geo-location information for one or more endpoints associated with the user, wherein the geo-location information is incorporated into the prioritization,
   wherein the geo-location information includes whether a mobile endpoint associated with the user is co-located with a higher priority endpoint associated with the user and, if so, incoming calls are routed to the higher priority endpoint, and, if not, incoming calls are routed to the mobile endpoint.

2. The system of claim 1, wherein prioritizing the endpoints in order of desired contact includes specifying that calls are to ring multiple endpoints sequentially.

3. The system of claim 1, wherein prioritizing the endpoints in order of desired contact includes specifying that calls are to ring multiple endpoints simultaneously.

4. The system of claim 1, wherein prioritizing the endpoints in order of desired contact includes prioritizing video endpoints ahead of audio-only endpoints.

5. The system of claim 1, the memory storing additional instructions for execution by the processor to cause the system to present a directory of other users, including one or more endpoints associated with each other user, and to permit the user to select one or more other users for a conference.

6. The system of claim 5, the memory storing additional instructions for execution by the processor to cause the system to establish an optimal conference with the user and a selected one or more other users taking into account video, audio, and call options configured by the selected one or more other users including endpoint priority set by the one or more other users.

7. The system of claim 6, wherein establishing an optimal conference includes taking into account geo-location information of the user and the selected one or more other users.

8. The system of claim 1, the memory storing additional instructions for execution by the processor to cause the system to present to a user an active conference control interface permitting the user to control a conference by controlling one or more aspects of one or more conference participants' interaction with the conference, including muting or dropping the one or more participants.

9. The system of claim 1, the memory storing additional instructions for execution by the processor to cause the system to present to a user a meeting management interface allowing the user to create conference invitations and to identify one or more conferences the user wishes to join and specify a means by which the user will join.

10. The system of claim 9, wherein the user can identify one or more conferences to join by reference to context specific information about the conferences, the context specific information selected from a group consisting of: time, position, participants, topic, and category of the conference.

11. The system of claim 9, wherein the means by which the user will join include video and audio-only.

12. The system of claim 11, the memory storing additional instructions for execution by the processor to cause the system to present a mute all button permitting the user to mute all participants in the conference.

13. The system of claim 11, the memory storing additional instructions for execution by the processor to cause the system to present a record button permitting the user to record the conference.

14. The system of claim 11, the memory storing additional instructions for execution by the processor to cause the system to present a lock meeting button permitting the user to prevent additional participants from joining the conference.

15. The system of claim 11, the memory storing additional instructions for execution by the processor to cause the system to perform one or more of present an add participant button permitting the user to add an additional participant to the conference.

16. The system of claim 11, the memory storing additional instructions for execution by the processor to cause the system to present a content interface allowing the user to present media content in the conference or to allow one of the one or more other conference participants to do so.

17. The system of claim 1, the memory further storing instructions to cause the system to present to the user a meeting management interface allowing the user to send conference invitations and to identify one or more conferences the user wishes to join and specify a means by which the user will join.

18. The system of claim 17, wherein the meeting management interface is an add-on to an existing personal information management software package.

19. The system of claim 17, the memory storing additional instructions for execution by the processor to cause the system to establish an optimal conference with the user and selected one or more other users taking into account video, audio, and call options configured by the selected one or more other users including endpoint priority set by the one or more other users.

20. The system of claim 19, wherein establishing an optimal conference includes taking into account geo-location information of the user and the selected one or more other users.

21. The system of claim 17, wherein the user can identify one or more conferences to join by reference to context specific information about the conferences, the context specific information comprising one or more of: time, position, participants, topic, and category of the conference.

* * * * *